(12) United States Patent
Rainisto

(10) Patent No.: US 10,126,813 B2
(45) Date of Patent: Nov. 13, 2018

(54) OMNI-DIRECTIONAL CAMERA

(71) Applicant: Microsoft Technology Licensing, LLC, Redmond, WA (US)

(72) Inventor: Roope Rainisto, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 14/859,750

(22) Filed: Sep. 21, 2015

(65) Prior Publication Data
US 2017/0085861 A1   Mar. 23, 2017

(51) Int. Cl.
*H04N 13/207* (2018.01)
*G06F 3/01* (2006.01)
*H04N 13/02* (2006.01)

(52) U.S. Cl.
CPC .............. *G06F 3/013* (2013.01); *G06F 3/017* (2013.01); *H04N 13/0207* (2013.01)

(58) Field of Classification Search
CPC ........ H04N 13/025; G06F 3/013; G06F 3/017
See application file for complete search history.

(56) References Cited

U.S. PATENT DOCUMENTS

| 6,867,798 B1 | 3/2005 | Wada et al. |
| 7,428,000 B2 | 9/2008 | Cutler et al. |
| 7,697,827 B2 | 4/2010 | Konicek |
| 7,884,849 B2 | 2/2011 | Yin et al. |
| 7,940,299 B2 | 5/2011 | Geng |
| 8,228,364 B2* | 7/2012 | Cilia ....................... B60R 11/04 348/39 |
| 8,577,126 B2 | 11/2013 | Jones et al. |
| 9,007,430 B2* | 4/2015 | Seidl ....................... G06T 15/10 348/36 |
| 2001/0015751 A1 | 8/2001 | Geng |
| 2006/0250505 A1* | 11/2006 | Gennetten .......... H04N 5/23212 348/218.1 |
| 2008/0106634 A1* | 5/2008 | Masuda ............... H04N 5/2258 348/362 |
| 2009/0322915 A1* | 12/2009 | Cutler ................ H04N 5/23219 348/251 |
| 2010/0128118 A1 | 5/2010 | Swindells et al. |
| 2011/0043606 A1 | 2/2011 | Yang |
| 2011/0205379 A1 | 8/2011 | Konicek |
| 2011/0227913 A1 | 9/2011 | Hyndmanm |

(Continued)

FOREIGN PATENT DOCUMENTS

| CN | 202309768 U | 7/2012 |
| CN | 103984100 A | 8/2014 |

OTHER PUBLICATIONS

"Experience a New World of Images", Published Date: Nov. 6, 2014 Available at: https://theta360.com/en/about/theta/.

(Continued)

*Primary Examiner* — Neil Mikeska

(57) ABSTRACT

A 360-degree camera captures images from every direction. The user specifies the region of interest for the camera with a gesture, for example by pointing with one end of the device to a specific direction. The region of interest is saved as metadata with the image or video recording. The device may assign the user among multiple persons near the device by detecting from the omnidirectional view who has been the last person in physical contact with the device. The region of interest may be assigned with voice commands.

20 Claims, 6 Drawing Sheets

(56) References Cited

U.S. PATENT DOCUMENTS

| | | | | |
|---|---|---|---|---|
| 2012/0113209 | A1* | 5/2012 | Ritchey | H04N 5/2254 |
| | | | | 348/14.02 |
| 2012/0206565 | A1* | 8/2012 | Villmer | H04N 1/00 |
| | | | | 348/36 |
| 2012/0300061 | A1 | 11/2012 | Osman et al. | |
| 2014/0092043 | A1 | 4/2014 | de Leon et al. | |
| 2014/0153916 | A1 | 6/2014 | Kintner | |
| 2014/0375760 | A1* | 12/2014 | Lee | H04N 5/23238 |
| | | | | 348/36 |
| 2015/0002393 | A1 | 1/2015 | Cohen et al. | |

OTHER PUBLICATIONS

Han, Gregory, "Tamaggo 360-Imager: One Button 360-Degree Photos", Published on: Jan. 17, 2012, Available at: http://www.apartmenttherapy.com/tamaggo-360-imager-one-button-360-degree-photos-ces-2012-164504.

"GoPano Micro", May 22, 2015 Available at: http://www.gopano.com/products/gopano-micro#page=technology.

Garg, et al., "Rotating Camera Based on Speaker Voice", In International Journal of Advanced Research in Electrical, Electronics and Instrumentation Engineering, vol. 2, Issue 5, May 2013, pp. 1674-1681.

Glasse, Jeff, "Dot: 360° Video Capture for the Iphone 4", Published on: May 19, 2015 Available at: https://www.kickstarter.com/projects/dot/dot-360o-video-capture-for-the-iphone-4.

Nguyen, Chuong H., "Cycloramic App Automatically Spins Iphone 6 to Capture 360-Degree Panoramas", Published on: Oct. 6, 2014 Available at: http://www.imore.com/cycloramic-app-automatically-spins-iphone-6-capture-360-degree-panoramas.

"How do I use the Camera to Capture Photos and Videos on my Samsung Galaxy Nexus™", May 21, 2015 Available at: http://www.samsung.com/us/support/howtoguide/N0000004/6479/41175.

"Omni-Directional Reconnaissance (ODR) in Mobile C4ISR platforms", May 21, 2005 Available at: http://www.mistralsolutions.com/omni-directional-reconnaissance-odr-mobile-c4isr-platforms/.

* cited by examiner

OMNI-DIRECTIONAL CAMERA

BACKGROUND

Portable imaging devices may capture omnidirectional images, for example having a 360-degree field of view. The imaging device is for example a camera with a specific lens assembly, a smartphone or an omnidirectional camera that may record still images or videos. A video recording may be watched with immersive devices allowing the user to select the viewing direction, for example by turning the device or, if the device is worn by the user, turning his or her head. When the image is captured or the video recorded, the user of the device may want to focus the attention of the viewer on certain objects. The device may have a default viewing direction that relates to the "front side" of the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A 360-degree camera captures images from every direction. The user specifies the region of interest for the camera with a gesture, for example by pointing with one end of the device to a specific direction. The region of interest is saved as metadata with the image or video recording. The device may assign the user among multiple persons near the device by detecting from the omnidirectional view who has been the last person in physical contact with the device. The region of interest may be assigned with voice commands.

Many of the attendant features will be more readily appreciated as they become better understood by reference to the following detailed description considered in connection with the accompanying drawings. The embodiments described below are not limited to implementations which solve any or all of the disadvantages of omnidirectional imaging in portable devices.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although the present embodiments are described and illustrated herein as being implemented in an omnidirectional camera, the device described is provided as an embodiment and not a limitation. As those skilled in the art will appreciate, the present embodiments are suitable for application in a variety of different types of portable, mobile and/or hand-held apparatuses that may be equipped with the omnidirectional camera. Embodiments include for example tablets, laptops, smart watches, wearable devices, or gaming consoles having a camera and/or suitable sensors for detecting a user's gesture. In one embodiment the omnidirectional camera is a 360-degree camera or a camera with a visual field that covers the entire sphere around the camera. The sphere view may be partially blocked by the camera body. In one embodiment the omnidirectional camera is a camera having field of view over 180 degrees. The portable device may have different form factors; for example, it may be a flat device with a large display, a spherical element or a baton comprising a camera element. A gesture is herein defined as a motion of an object or body part of the user, wherein the motion has a starting position and a final position. The gesture is not a simple action of pushing a button, touching a software/touch button or operating a switch that has two positions: on/off. In one embodiment a voice command is the gesture.

Figure 1:
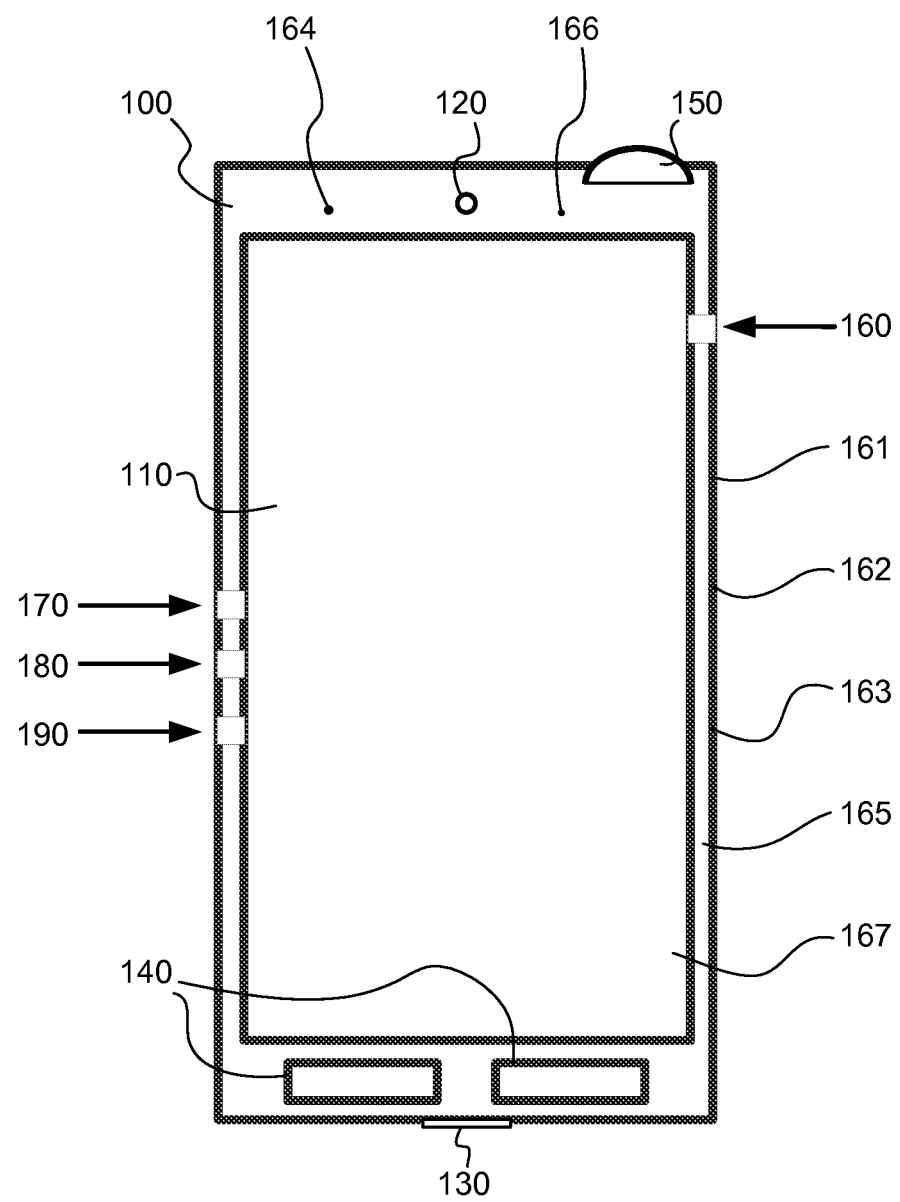
FIG. 1 shows a portable, hand-held device according to an embodiment, wherein the portable device is a smartphone.

FIG. 1 illustrates a portable, hand-held device according to an embodiment, wherein the portable device is a smartphone. The portable device comprises a body 100 comprising a display 110, a speaker 120, a microphone 130 and keys 140. The display 110 is usually on the front side of the portable device. A camera 150 comprises a lens configured to capture an omnidirectional image as the camera lens extends to the front side and to the backside of the portable device. The camera may comprise multiple lenses or the camera may comprise multiple modules wherein each module has a sensor and a lens facing different directions. The portable device may comprise multiple input sensors 160 to detect the environment and to enable interaction with the user interface. Embodiments of input sensors 160 that may be implemented in the portable device include a gyroscope 161, an accelerometer 162, a magnetometer 163, a camera 150, a microphone 130, an ambient light sensor 164, a force sensor 165, a proximity sensor 166 and a touch sensor 167. A gesture detecting element 180 is configured to receive or detect a user gesture through the input sensor 160. The gesture detecting element 180 may be implemented partially by the operating system of the portable device; it may be implemented by hardware or partially by hardware and embedded software. At least one sensor 160 may be included in the gesture detecting element 180, or the gesture detecting element 180 may be directly connected to the input sensor 160. An image stabilization element 190 is configured to stabilize the omnidirectional view, for example by keeping the omnidirectional view in horizontal plane regardless of the orientation of the camera 150. The image stabilization element 190 may be implemented partially by the operating system of the portable device; it may be implemented by hardware or partially by hardware and embedded software. The portable device comprises at least one processor and at least one memory including computer program code for one or more programs. The at least one memory and the computer program code are configured, with the at least one processor, to cause the apparatus to perform at least the functionality described herein. The system described hereinafter may comprise a portion of the portable device, its components and/or peripherals connected to the portable device.

The user-related gesture detecting element 180 is configured to detect a user-related gesture indicating a region of interest in the omnidirectional view. The region of interest is defined herein as a portion of the omnidirectional view that is captured as an image or a video. In one embodiment the region of interest is a predefined segment of the omnidirectional view that corresponds to a human field of vision. In one embodiment the region of interest is configurable by the user. The camera 150 parameters may be adjusted according to the region of interest. For example, in the omnidirectional view one side of the view may be sunny and the other side in a shadow. The image may be captured on a single sensor, wherein for example the exposure is selected according to the side on which the region of interest is located. In one embodiment the focus is adjusted according to the region of interest. The portable device combines information comprising the region of interest with the captured omnidirectional view. In one embodiment the information comprising the region of interest is formed into a metadata that is saved in the memory with the captured image or video. The metadata is for example an XML file comprising multiple regions of interest with time data corresponding to the captured video. In one embodiment the image or the video is combined into a single file with the information of region of interest. When the video is played, the region of interest is combined to the video stream and the viewer of the video may follow the field of vision as intended by the person recording the video. The viewer may choose to view other directions than the region of interest in the omnidirectional image or video.

Figure 2:
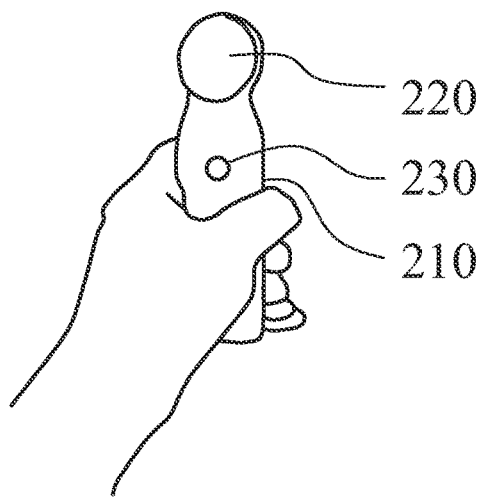
FIG. 2 shows one embodiment of the portable device.

The portable device may respond to different user-related gestures. In one embodiment the user-related gesture is a unidirectional movement of the device and the input sensor is configured to detect a starting position of the device in the unidirectional movement and a final position of the device in the unidirectional movement. One gesture is a pointing gesture, wherein the portable device has one end configured for pointing. The portable device may comprise a mark indicating the pointing end, and the device may comprise a handle wherein a portion of the device extends from the handle, or a baton form. An embodiment of the portable device comprising the baton form and the omnidirectional camera is shown in FIG. 2, wherein the device comprises the handle 210, the omnidirectional camera 220 and a button 230 for interacting with the device. In this embodiment the camera 220 forms the pointing end of the device.

Figure 3A:
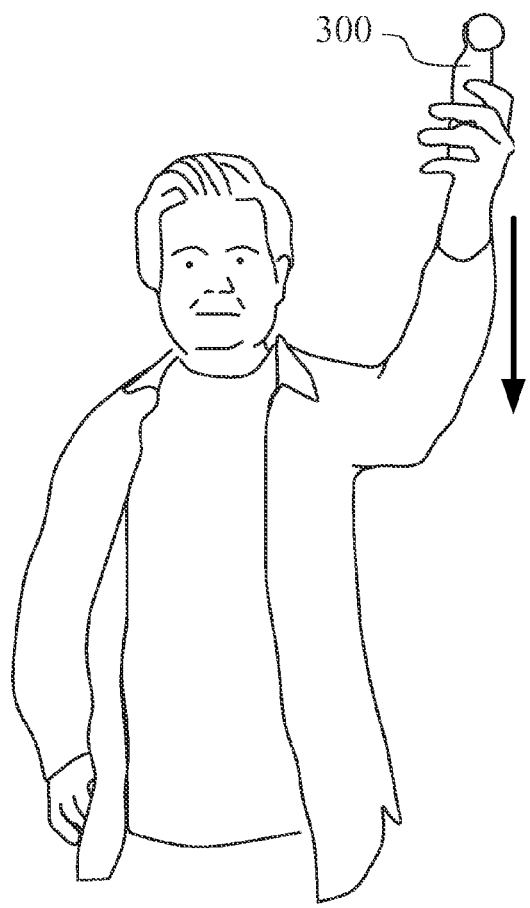
FIG. 3a shows one embodiment of a starting position of the pointing gesture.
Figure 3B:
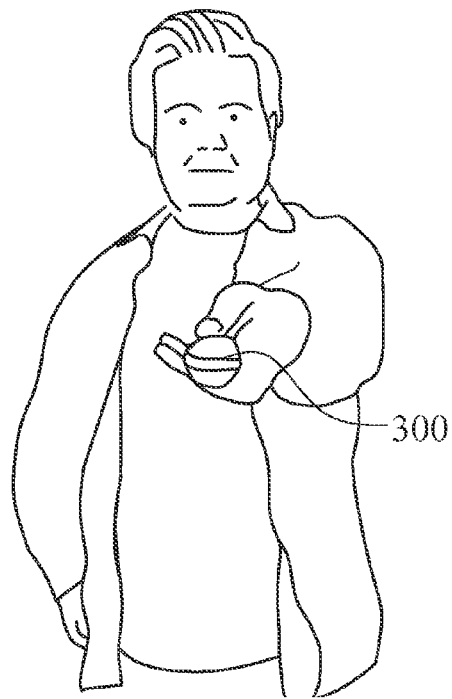
FIG. 3b shows one embodiment of a final position of the pointing gesture.

FIG. 3a shows one embodiment of a starting position of the pointing gesture. The user has lifted the portable device 300 above the head level. In one embodiment the computer program code and the at least one memory are configured, with the at least one processor, to detect from the omnidirectional view the starting position of the user-related gesture when the user is holding the device above the user's head level. The omnidirectional camera 300 comprises a face detection algorithm and a sensor indicating the angle of the device, for example an accelerometer. The accelerometer detects when the portable device 300 is held in an upright position and the camera detects the face of the user. The portable device 300 detects the angle to the face of the user, and if the angle is wider than a predefined limit, the portable device 300 detects the starting position of the pointing gesture. FIG. 3b shows one embodiment of a final position of the pointing gesture. The user lowers the portable device 300 in a single unidirectional movement, wherein the final position indicates the direction to the region of interest. After the final position is reached, the portable device 300 will keep the region of interest in the direction defined by the gesture. According to one embodiment, the direction of the region of interest in the omnidirectional view is defined as the intersection of the unidirectional movement and the horizontal level of the device. The camera or the portable device 300 may be facing different directions, but the user-related gesture has overridden the default direction that may for example be the "front" of the device. The transition between the default region of interest and the user-defined region of interest may be smooth, with a predefined moving speed from one direction to another.

Figure 4A:
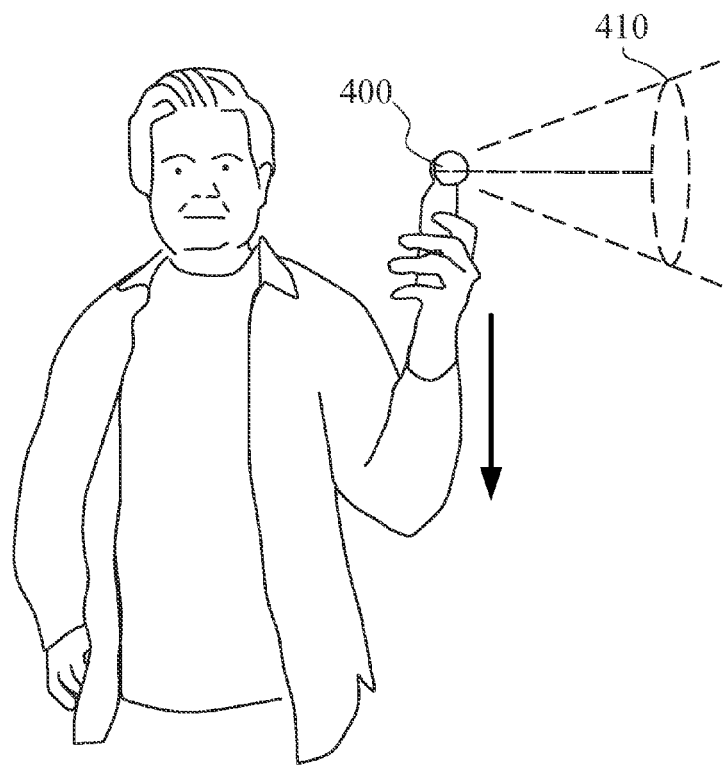
FIG. 4a shows one embodiment of a starting position of the pointing gesture.
Figure 4B:
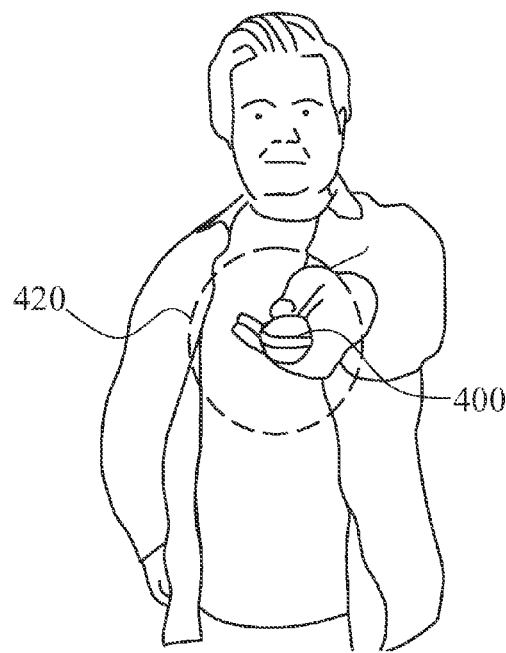
FIG. 4b shows one embodiment of a final position of the pointing gesture.
Figure 4C:
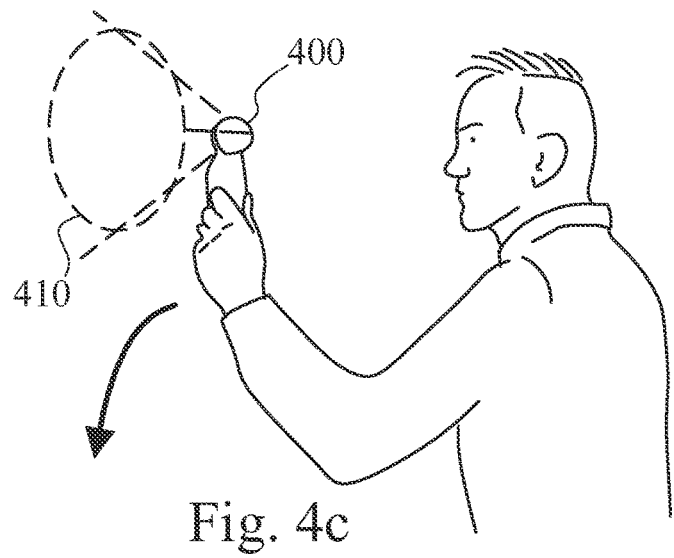
FIG. 4c shows the starting position from another angle.
Figure 4D:
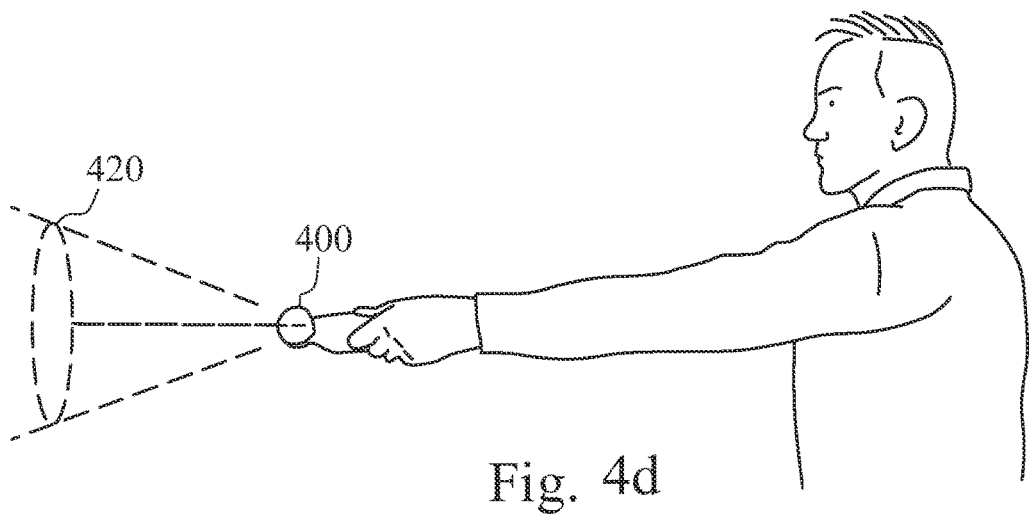
FIG. 4d shows the final position from another angle.

FIG. 4a shows one embodiment of a starting position of the pointing gesture, wherein the portable device 400 is held upright in a default position. FIG. 4c shows the same starting position from another angle. FIG. 4b illustrates one embodiment of a final position and FIG. 4d shows the same final position from another angle. When the user starts to tilt the portable device 400, FIG. 4a and FIG. 4c, the image stabilization element 190 holds the default region of interest 410 or the previous region of interest 410 until the device 400 has been tilted to a pointing direction according to FIG. 4b and FIG. 4d, illustrating one embodiment of a final position. In the starting position the region of interest 410 is pointed left. In the final position the region of interest 420 has turned according to the pointing gesture to the front. The portable device 400 is tilted towards the desired region of interest 420 over the predefined limit. The tilting angle may be 90 degrees or at least 45 degrees. Angle values in this context are merely examples, not limiting the angles of the gestures.

The portable device may be subjected to movement during the user-related gesture. For example, the pointing gesture described hereinbefore may move the camera, and the default direction of the region of interest is set in a fixed direction when the portable device detects the starting position of the pointing gesture. The region of interest is kept in the fixed direction during the user-related gesture. The user-related gesture detecting element 180 detects the starting position and sends to the image stabilization element 190 information to stabilize the region of interest during the gesture. The omnidirectional view is captured in the orientation of the starting position. If the user does not proceed with the unidirectional movement or any other predefined gesture that ends to the final position, the user-related gesture detecting element 180 releases the fixed direction and the portable device may return to applying the default direction for the region of interest.

In one embodiment the camera 150 is the sensor detecting the user gesture. The camera detects the direction of eyes of the user, wherein the direction of the stare or the direction of the eye movement indicates the region of interest within the captured image or video. The user-related gesture is configured to follow the eyes of the user. The omnidirectional view captures the image of the user; the face detection algorithm detects the face of the user and the direction of the eyes. The computer program code and the at least one memory are configured, with the at least one processor, to detect from the omnidirectional view where the user is looking at to define the region of interest. In this embodiment the user-related gesture is the eye direction. The starting position of the eye direction detection overrides the default direction of the region of interest in the omnidirectional view. The starting position may be a predefined gesture, such as raising the camera above the head level and lowering it down at the same angle, wherein the camera moves up and down along an imaginary vertical line. The starting event may be selected from the user interface, for example by selecting a feature from a menu. When the portable device follows the eye direction of the user, the user may position the device for example on a stand. The portable device follows the user while capturing everything in its view. The region of interest may be guided without requiring physical contact of the user. The region of direction is selected in the same direction which the user is looking, wherein in an embodiment the region of interest is changed horizontally at the same angle as the users gaze. The portable device and the user's head are considered as the center points of the angle definition. If the device does not detect the user's face, it may return to the default region of interest or keep the region of interest in the latest detected direction.

Figure 5A:
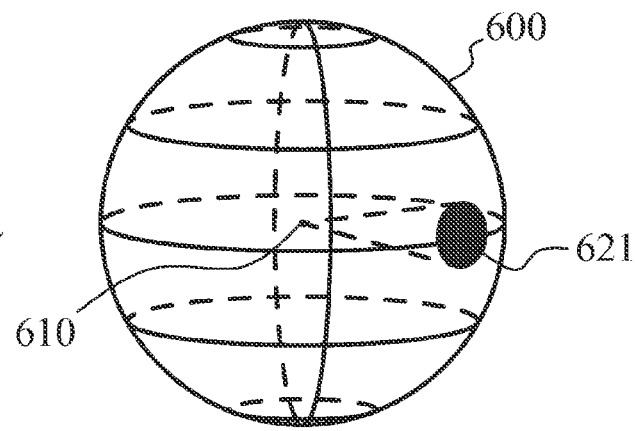
FIG. 5a schematically shows a field of view around the omnidirectional camera with a first region of interest.
Figure 5B:
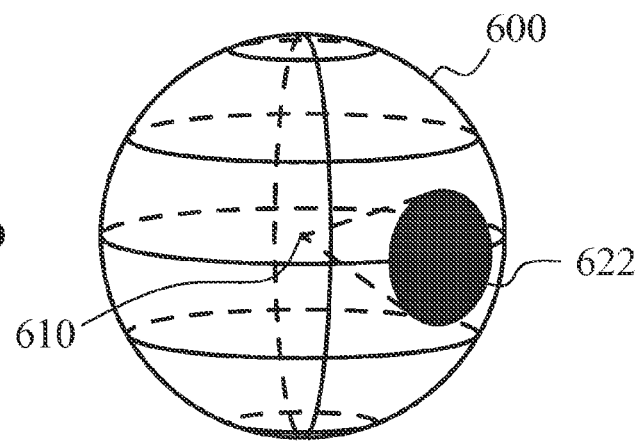
FIG. 5b schematically shows a field of view around the omnidirectional camera with a second region of interest.
Figure 5C:
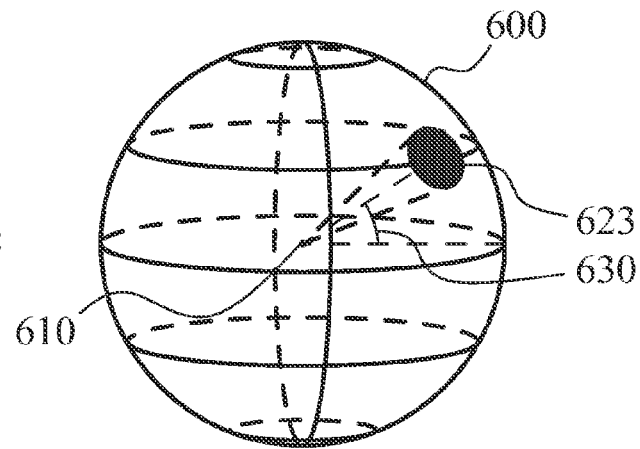
FIG. 5c schematically shows a field of view around the omnidirectional camera with a third region of interest.

FIG. 5a schematically illustrates a spherical view 600, the field of view around the omnidirectional camera 610. The region of interest 621 is shown as black intersection in the spherical view 600, wherein the region of interest 621 illustrates one portion of the field of view from the omnidirectional camera 610. The direction of the region of interest 621 may be a default region of interest set by the omnidirectional camera 610, or it may be, following a user-related gesture, overriding the default direction. The size of the region of interest may be adjustable. FIG. 5b shows an enlarged region of interest 622. In one embodiment the adjustable region of interest 622 may be applied as a zoom function that is shown during the playback of the captured video. FIG. 5c illustrates one embodiment where the region of interest 623 is directed above the vertical level of the omnidirectional camera 610. The region of interest 623 may be pointed in any direction on the spherical view 600; for example in FIG. 5c, the region of interest 623 is set at an angle 630 above the horizontal plane of the omnidirectional camera 610. The user-related gesture may be configured to detect any final direction for the region of interest 623 in the field of view 600. For example, the pointing gesture may end at a declined position, wherein the final position of the pointing gesture defines the angle of the region of interest 623 in the x-, y- and z-plane.

In one embodiment the computer program code and the at least one memory are configured, with the at least one processor, to define a user from the omnidirectional view and to detect the user-related gesture from the omnidirectional view. The face detection algorithm may identify the user when the face has been stored in the memory of the portable device as the assigned user. In one embodiment the assigned user may change dynamically. The user is defined as the person having last had physical contact with the device. The user may release contact from the portable device, leave it for example on a stand or on a table and continue guiding the region of interest for example by changing the eye direction. Another person may take over the control of the region of interest by touching the portable device. The portable device is configured to detect a hand and/or an arm. In one embodiment the device comprises a handle or a predefined point, wherein the device may detect the touch by a proximity sensor, a touch sensitive sensor or from the omnidirectional view. In one embodiment the region of interest is set by gestures detected near the body 100 of the device, for example above the display 110. The user-related gesture is detected with a camera 150, a proximity sensor 166 or an ultrasound emitter-microphone receiver. In one embodiment the user-related gesture is a unidirectional movement of an object such as a hand, a finger, multiple fingers, eyes or a stylus. The movement may occur along a path in the vicinity of the portable device. The portable device may detect gestures in the air. In one embodiment the input sensor is configured to detect the starting position of the object in the unidirectional movement and the final position of the unidirectional movement.

In one embodiment the input sensor is a microphone and the computer program code and the at least one memory are configured, with the at least one processor, to detect the region of interest from a voice command received from the user. The region of interest is set by the voice command, wherein the portable device comprises a microphone 130 to capture the voice command. In one embodiment the voice of the user is detected as an indication to temporarily change the region of interest towards the user. The user may give narration to the video and the region of interest turns towards the user while he/she is talking and returns back to the original region of interest. The user may give narration to the video without looking at the portable device, allowing the portable device to select the region of interest.

The portable device may be configured to detect the region of interest, while the user may move freely and the portable device may lock onto subjects or the horizon or the direction the user is walking.

One aspect discloses a device, comprising at least one processor and at least one memory including computer program code for one or more programs; a portable camera configured to capture an omnidirectional view; and a user-related gesture detecting element comprising an input sensor; wherein the user-related gesture detecting element is configured to detect a user-related gesture indicating a region of interest in the omnidirectional view; wherein the computer program code and the at least one memory are configured, with the at least one processor, to cause the device to combine the captured omnidirectional view with information of the region of interest. In one embodiment the camera is configured to capture an omnidirectional video. In one embodiment the user-related gesture is a unidirectional movement of the device and the input sensor is configured to detect a starting position of the device in the unidirectional movement and a final position of the device in the unidirectional movement. In one embodiment the gesture detecting element is configured to provide information to an image stabilization element to stabilize the region of interest during the gesture. In one embodiment the user-related gesture is a pointing gesture of the device. In one embodiment the computer program code and the at least one memory are configured, with the at least one processor, to detect from the omnidirectional view the starting position of the user-related gesture when the user is holding the device above the user's head level. In one embodiment the computer program code and the at least one memory are configured, with the at least one processor, to detect from the omnidirectional view where the user is looking at to define the region of interest. In one embodiment the computer program code and the at least one memory are configured, with the at least one processor, to define a user from the omnidirectional view and to detect the user-related gesture from the omnidirectional view. In one embodiment the computer program code and the at least one memory are configured, with the at least one processor, to define a user from the omnidirectional view as the person having last had physical contact with the device. In one embodiment the input sensor is a microphone and the computer program code and the at least one memory are configured, with the at least one processor, to detect the region of interest from a voice command received from the user.

One aspect discloses a system, comprising a device comprising at least one processor and at least one memory including computer program code for one or more programs; a portable camera configured to capture an omnidirectional view; and a user-related gesture detecting element configured to detect a user-related gesture indicating a region of interest in the omnidirectional view; wherein the computer program code and the at least one memory are configured, with the at least one processor, to cause the device to store the omnidirectional view in the at least one memory; and to cause the device to form metadata comprising the region of interest in the omnidirectional view. In one embodiment the camera is configured to capture an omnidirectional video. In one embodiment the user-related gesture is a unidirectional movement of the device and the input sensor is configured to detect a starting position of the device in the unidirectional movement and a final position of the device in the unidirectional movement. In one embodiment the gesture detecting element is configured to provide information to an image stabilization element to stabilize the region of interest during the gesture. In one embodiment the computer program code and the at least one memory are configured, with the at least one processor, to detect from the omnidirectional view the starting position of the user-related gesture when the user is holding the device above the user's head level. In one embodiment the computer program code and the at least one memory are configured, with the at least one processor, to detect from the omnidirectional view where the user is looking at to define the region of interest. In one embodiment the computer program code and the at least one memory are configured, with the at least one processor, to define a user from the omnidirectional view and to detect the user-related gesture from the omnidirectional view. In one embodiment the computer program code and the at least one memory are configured, with the at least one processor, to define a user from the omnidirectional view as the person having last had physical contact with the device. In one embodiment the computer program code and the at least one memory are configured, with the at least one processor, to select the exposure of the omnidirectional view from the region of interest.

One aspect discloses a method, comprising a portable camera capturing an omnidirectional view; a user-related gesture detecting element comprising an input sensor indicating a region of interest in the omnidirectional view; and combining the captured omnidirectional view with information of the region of interest. One aspect discloses a method, comprising combining a captured omnidirectional view with information of a region of interest in the omnidirectional view, the captured omnidirectional view having been captured by a portable camera, the region of interest in the omnidirectional view having been indicated by an input sensor of a user-related gesture detecting element.

An embodiment of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that are accessible by a computing based device. Computer-readable media may include, for example, computer storage media such as memory and communications media. Computer storage media, such as memory, include volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media do not include communication media. Therefore, a computer storage medium should not be interpreted to be a propagating signal per se. Propagated signals may be present in computer storage media, but propagated signals per se are not embodiments of computer storage media. Although the computer storage media are shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller may also be arranged to receive and process input from one or more devices, such as a user input device (e.g. a mouse, keyboard, camera, microphone or other sensor). In some embodiments the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Embodiments of tangible storage media include computer storage devices comprising computer-readable media such as disks, thumb drives, memory etc. and do not only include propagated signals. Propagated signals may be present in tangible storage media, but propagated signals per se are not embodiments of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an embodiment of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Although the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
   at least one processor and at least one memory including computer program code for one or more programs;
   a hand-held portable camera configured to capture an omnidirectional view while being held in a hand of a user; and
   a user-related gesture detecting element comprising an input sensor;
   wherein the user-related gesture detecting element is configured to detect movement of the hand-held portable camera in relation to the user while held in the hand of the user and determine a user-related gesture from said movement indicating a region of interest in the omnidirectional view;
   wherein the computer program code and the at least one memory are configured, with the at least one processor, to cause the device to combine the captured omnidirectional view with information of the region of interest.

2. A device according to claim 1, wherein the hand-held portable camera is configured to capture an omnidirectional video.

3. A device according to claim 1, wherein the user-related gesture is a unidirectional movement of the device and the input sensor is configured to detect a starting position of the device in the unidirectional movement and a final position of the device in the unidirectional movement.

4. A device according to claim 1, wherein the gesture detecting element is configured to provide information to an image stabilization element to stabilize the region of interest during the gesture.

5. A device according to claim 1, wherein the user-related gesture is a pointing gesture of the device.

6. A device according to claim 1, wherein the computer program code and the at least one memory are configured, with the at least one processor, to detect from the omnidirectional view the starting position of the user-related gesture when the user is holding the device above the user's head level.

7. A device according to claim 1, wherein the computer program code and the at least one memory are configured, with the at least one processor, to detect from the omnidirectional view where the user is looking at to define the region of interest.

8. A device according to claim 1, wherein the computer program code and the at least one memory are configured, with the at least one processor, to define a user from the omnidirectional view and to detect the user-related gesture from the omnidirectional view.

9. A device according to claim 1, wherein the computer program code and the at least one memory are configured, with the at least one processor, to define a user from the omnidirectional view as the person having last had physical contact with the device.

10. A device according to claim 1, wherein the input sensor is a microphone and the computer program code and the at least one memory are configured, with the at least one processor, to detect the region of interest from a voice command received from the user.

11. A system, comprising:
a device comprising at least one processor and at least one memory including computer program code for one or more programs;
a hand-held portable camera configured to capture an omnidirectional view while being held in a hand of a user; and
a user-related gesture detecting element configured to detect movement of the hand-held portable camera in relation to the user while held in the hand of the user and determine a user-related gesture from said movement indicating a region of interest in the omnidirectional view; wherein
the computer program code and the at least one memory are configured, with the at least one processor, to cause the device to store the omnidirectional view in the at least one memory; and
to cause the device to form metadata comprising the region of interest in the omnidirectional view.

12. A system according to claim 11, wherein the hand-held portable camera is configured to capture an omnidirectional video.

13. A system according to claim 11, wherein the user-related gesture is a unidirectional movement of the device and the input sensor is configured to detect a starting position of the device in the unidirectional movement and a final position of the device in the unidirectional movement.

14. A system according to claim 11, wherein the gesture detecting element is configured to provide information to an image stabilization element to stabilize the region of interest during the gesture.

15. A system according to claim 11, wherein the computer program code and the at least one memory are configured, with the at least one processor, to detect from the omnidirectional view the starting position of the user-related gesture when the user is holding the device above the user's head level.

16. A system according to claim 11, wherein the computer program code and the at least one memory are configured, with the at least one processor, to detect from the omnidirectional view where the user is looking at to define the region of interest.

17. A system according to claim 11, wherein the computer program code and the at least one memory are configured, with the at least one processor, to define a user from the omnidirectional view and to detect the user-related gesture from the omnidirectional view.

18. A system according to claim 11, wherein the computer program code and the at least one memory are configured, with the at least one processor, to define a user from the omnidirectional view as the person having last had physical contact with the device.

19. A system according to claim 11, wherein the computer program code and the at least one memory are configured, with the at least one processor, to select an exposure of the omnidirectional view from the region of interest.

20. A method, comprising:
detecting a user-related gesture indicating an area of interest in a captured omnidirectional view of a hand-held portable camera through detection of movement of the hand-held portable camera in relation to the user while held in the hand of the user; and
combining the captured omnidirectional view with information of a region of interest in the omnidirectional view.

* * * * *